United States Patent [19]
Alexander

[11] Patent Number: 5,758,059
[45] Date of Patent: May 26, 1998

[54] IN-CIRCUIT EMULATOR IN WHICH ABRUPT AND DEFERRED ARMING AND DISARMING OF SEVERAL EVENTS ON A MICROPROCESSOR CHIP ARE CONTROLLED USING A SINGLE-INPUT PIN

[75] Inventor: James W. Alexander, Portland, Oreg.

[73] Assignee: Intel Corporation, Santa Clara, Calif.

[21] Appl. No.: 408,111

[22] Filed: Apr. 17, 1995

Related U.S. Application Data

[63] Continuation of Ser. No. 985,563, Dec. 3, 1992, abandoned.
[51] Int. Cl.$^6$ ...................................... G06F 11/30
[52] U.S. Cl. ...................................... 395/183.06
[58] Field of Search ............... 395/183.01, 183.04, 395/183.06, 183.1, 183.11, 500, 591, 568, 183.13, 183.15, 184.01; 364/DIG. 1 MS File, DIG. 2 MS File

[56] References Cited

U.S. PATENT DOCUMENTS 4,674,089  6/1987  Poret et al. ...................... 371/25
4,998,197  3/1991  Kurakazu et al. .................. 364/200

Primary Examiner—Robert B. Harrell
Attorney, Agent, or Firm—Blakely, Sokoloff, Taylor & Zafman

[57] ABSTRACT

An in-circuit emulator on an integrated circuit chip having an input pin for externally triggering on-chip break mechanisms. A first break logic having a first arm input is connected to an instruction pointer counter (IP counter). The first break logic matches the IP counter to a first instruction execution address. A second break logic having a second arm input is connected to the IP counter. The second break logic matches the IP counter to a second instruction execution address and a third instruction execution address occurring a fixed time interval after the second instruction execution address in a mutistage pipe line of instructions. A sequencer logic connected to the input pin, the first arm input and the second arm input activates the second arm input after the input pin has been active for 1 cycle. The sequencer logic activates the first arm input after the input pin has been active for 2 cycles. Also provided is a fast and permanent break logic having an abrupt permanent beak input connected to the sequencer and a fast break input connected to the sequencer. The sequencer activates the abrupt permanent beak input after the input pin has been active for 3 cycles. The sequencer activates the fast break input after the input pin has been active for 4 cycles. This allows external abrupt and deferred arming and disarming of internal fast and permanent events, using the same input pin as was used in the past for just an abrupt break.

13 Claims, 6 Drawing Sheets

IN-CIRCUIT EMULATOR IN WHICH ABRUPT AND DEFERRED ARMING AND DISARMING OF SEVERAL EVENTS ON A MICROPROCESSOR CHIP ARE CONTROLLED USING A SINGLE-INPUT PIN

This application is a continuation of patent application Ser. No. 07/985,563, filed Dec. 3, 1992, now abandoned.

CROSS REFERENCE TO RELATED PATENTS

U.S. Pat. No. 5,597,456 entitled "Apparatus For Transferring Information Between An Interrupt Producer And An Interrupt Service Environment" of James W. Alexander, et al. filed Dec. 31, 1992, and assigned to Intel Corporation, the assignee of the present invention.

Statutory Invention Registration H1291 published Feb. 1, 1994, which was application Ser. No. 630,499 entitled "A Microprocessor In Which Multiple Instructions Are Executed In One Clock Cycle By Providing Separate Machine Bus Access To A Register File For Different Types Of Instructions" of Glen J. Hinton et al. filed Dec. 20, 1990; and, patent application Ser. No. 07/999,387, now abandoned, Entitled "Apparatus For Transferring Information Between An Interrupt Producer And An Interrupt Service Environment" Of James W. Alexander, et al. filed Dec. 31, 1992, both assigned to Intel Corporation, the assignee of the present invention.

BACKGROUND OF THE INVENTION

1. Field of the Invention

The present invention is related to data processing systems and more specifically to an in-circuit emulator in which abrupt and deferred arming and disarming of several events on a microprocessor chip are controlled using a single-input pin.

2. Prior Art

An in-circuit emulator (ICE) duplicates and imitates the behavior of a chip it emulates by using programming techniques and special machine features to permit the ICE to execute micro code written for the chip that it imitates. The emulator accepts the same data, executes the same micro code and gets the same results as the imitated chip, in the circuit being tested. One useful emulation function is that of an abrupt break mechanism, which stops the execution of micro code for debugging purposes. In the past a single pin was used to trigger an abrupt break externally. It is desirable to be able externally control abrupt and deferred arming and disarming of internal fast and permanent events, using the same input pin as was used in the past for just an abrupt break. There are not enough pins to be able to assign one pin for each of these emulator functions.

It is an object of the present invention to provide an apparatus that will control a number of on-chip break mechanisms externally using only a single input pin.

SUMMARY OF THE INVENTION

Briefly, the above object is accomplished in accordance with the invention by providing an in-circuit emulator on an integrated circuit chip having an input pin for externally triggering on-chip break mechanisms. The emulator includes an instruction pointer counter (IP counter) and a first break logic connected to the IP counter. The first break logic has a first arm input and is capable of matching the IP counter to a first instruction execution address. A second break logic is connected to the IP counter and has a second arm input. The second break logic is capable of matching the IP counter to a second instruction execution address and a third instruction execution address occurring a fixed time interval after the second instruction execution address in a mutistage pipe line of instructions. A sequencer logic is connected to the input pin, the first arm input and the second arm input. The sequencer logic includes first means for activating the second arm input after the input pin has been active for a first number of cycles and the sequencer logic includes second means for activating the first arm input after the input pin has been active for a second number of cycles.

The invention has the advantage that highly synchronous break controls requiring less slip are assigned shorter time-encoded pulse widths, and less synchronous controls which can tolerate more slip are assigned longer pulse widths.

The invention has the advantage that one pin can be used to not only generate an abrupt break, but can also be used to control arming and disarming of internal fast and permanent events.

The foregoing and other objects, features, and advantages of the invention will be apparent from the following more particular description of a preferred embodiment of the invention as illustrated in the accompanying drawings.

DESCRIPTION OF THE PREFERRED EMBODIMENT

Figure 1:
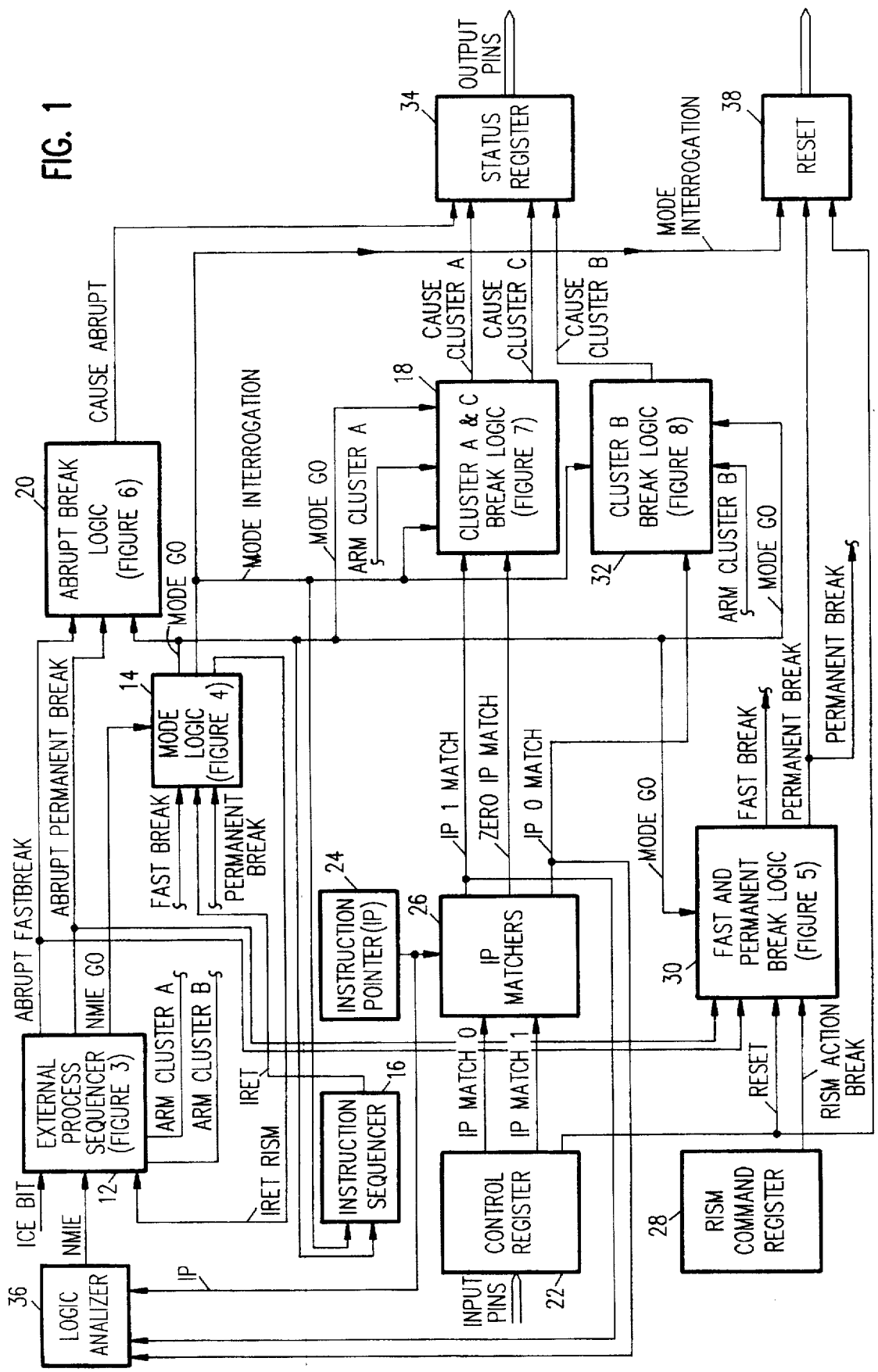
FIG. 1 is a functional block diagram of a microprocessor emulator in which the present invention is embodied.

FIG. 1 is a block diagram of a microprocessor emulator in which the present invention is embodied. The emulator is comprised of an external process sequencer (12) which includes nonmaskable interrupt for the emulator (NMIE), control register (22), reduced instruction set monitor or RISM command register (28), mode logic (14), fast and permanent break logic (30), abrupt break logic (20), Cluster A and C break logic (18), Cluster B break logic (32), and reset block (38). The details of the logic are shown in FIGS. 4 through 8.

Figure 2:
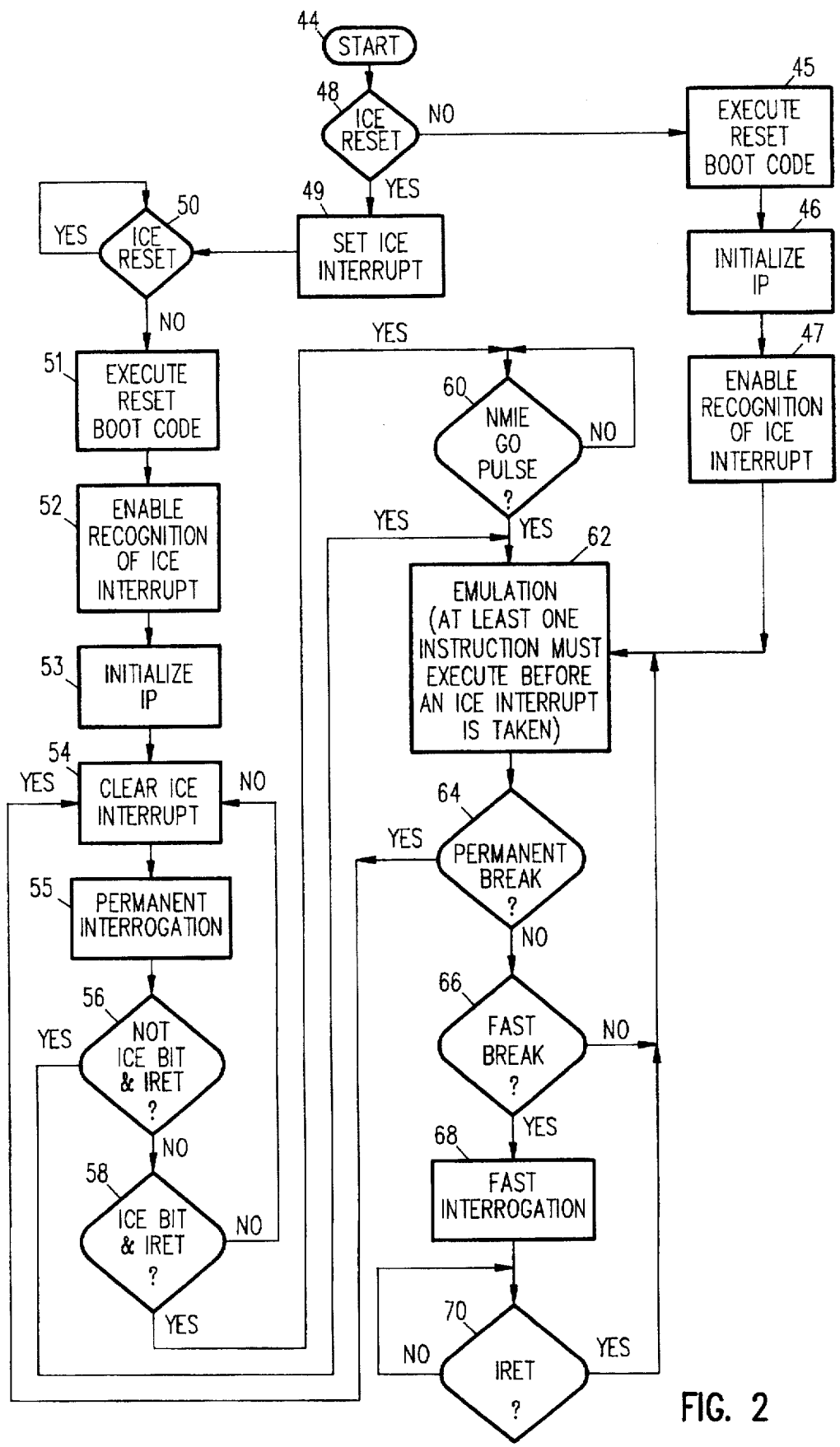
FIG. 2 is a flow chart of the operation of the logic of FIG. 1.

Refer now to FIG. 2 which is a flow chart which illustrates four states and the transitions between them with respect to the logic of the emulator shown in FIG. 1. ICE RESET (52) causes the logic to assume the PERMANENT INTERROGATION state (54). The IRET (interrupt return) signal is activated in response to the last instruction in the instruction stream of the Reduced Instruction Set Monitor (RISM). ICEBIT is a non-volatile memory cell only activated when the microprocessor is used for ICE (10). If IRET is active and ICE BIT is not asserted (56), then the logic transfers to the EMULATION state (62). From the EMULATION state, a permanent break (64) causes the logic to return to the PERMANENT INTERROGATION state (54).

If IRET is active and ICE BIT is asserted (58), then the logic waits for the NMIE GO pulse (60). When the NMIE GO pulse (60) occurs, then the logic transfers to the EMULATION state (62). From the EMULATION state, a permanent break causes the logic to return to the PERMANENT INTERROGATION state (54).

In this logic a permanent break holds precedence over a fast break. From the EMULATION state (62), absent a permanent break (64), a fast break (66) causes the logic to transfer to the FAST INTERROGATION state (68). The IRET (instruction return) signal (70) causes the logic to exit the FAST INTERROGATION state (68) and return to the EMULATION state (62).

Figure 4:
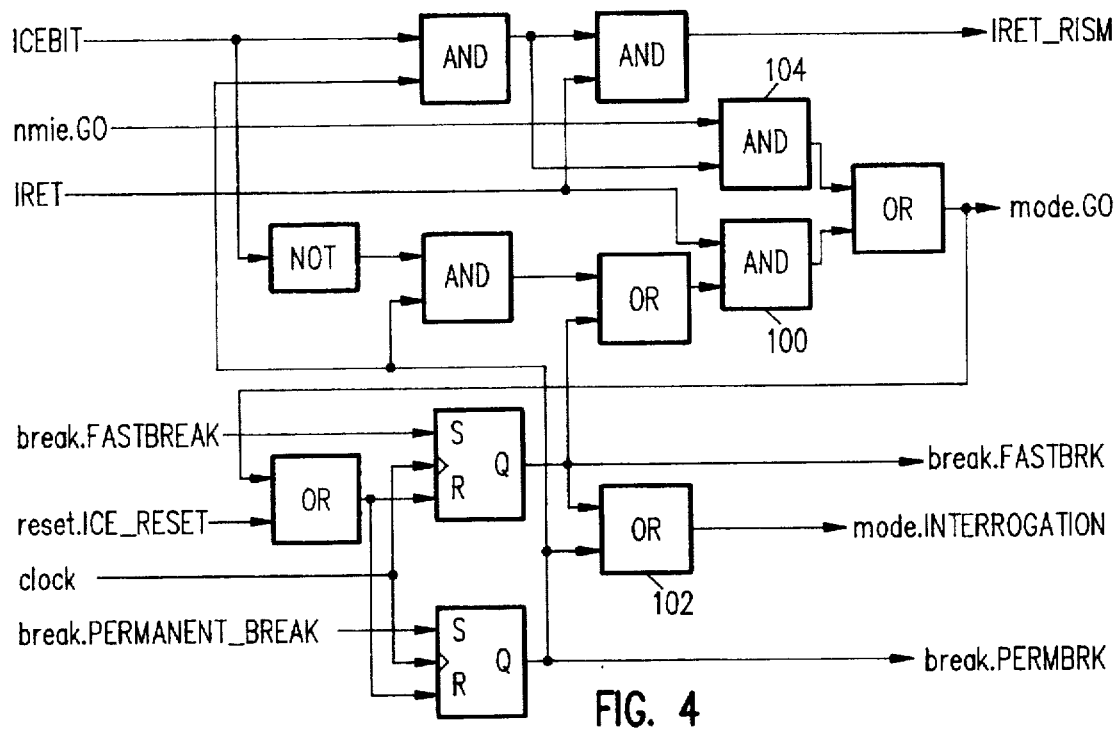
FIG. 4 is a block diagram of the mode logic shown in FIG. 1.

The mode signals correspond to those shown in the mode logic of FIG. 4. INTERROGATION is active in permanent interrogation mode and fast interrogation mode. GO is active during the ICEBIT and GO and the IRET and not ICEBIT transitions from PERMANENT INTERROGATION; and during the IRET transition from FAST INTERROGATION.

Break is the transition from emulation mode to interrogation mode. Breaking emulation involves recording the cause of the break in the status register (34) and regaining control of the microprocessor. A logic analizer (36) generates NMIE breaks and operates in parallel with on-chip breaks. The sequencer (12) can arm two of the clusters, cluster A and cluster B. When activated by the logic analizer due to a match on an execution address, an NMIE break will lag the on-chip break by many clocks. A NMIE signal is interpreted as a GO during the interrogation state. The NMIE signal performs the function of invoking a break and activating the GO during ICE interrogation.

Figure 3:
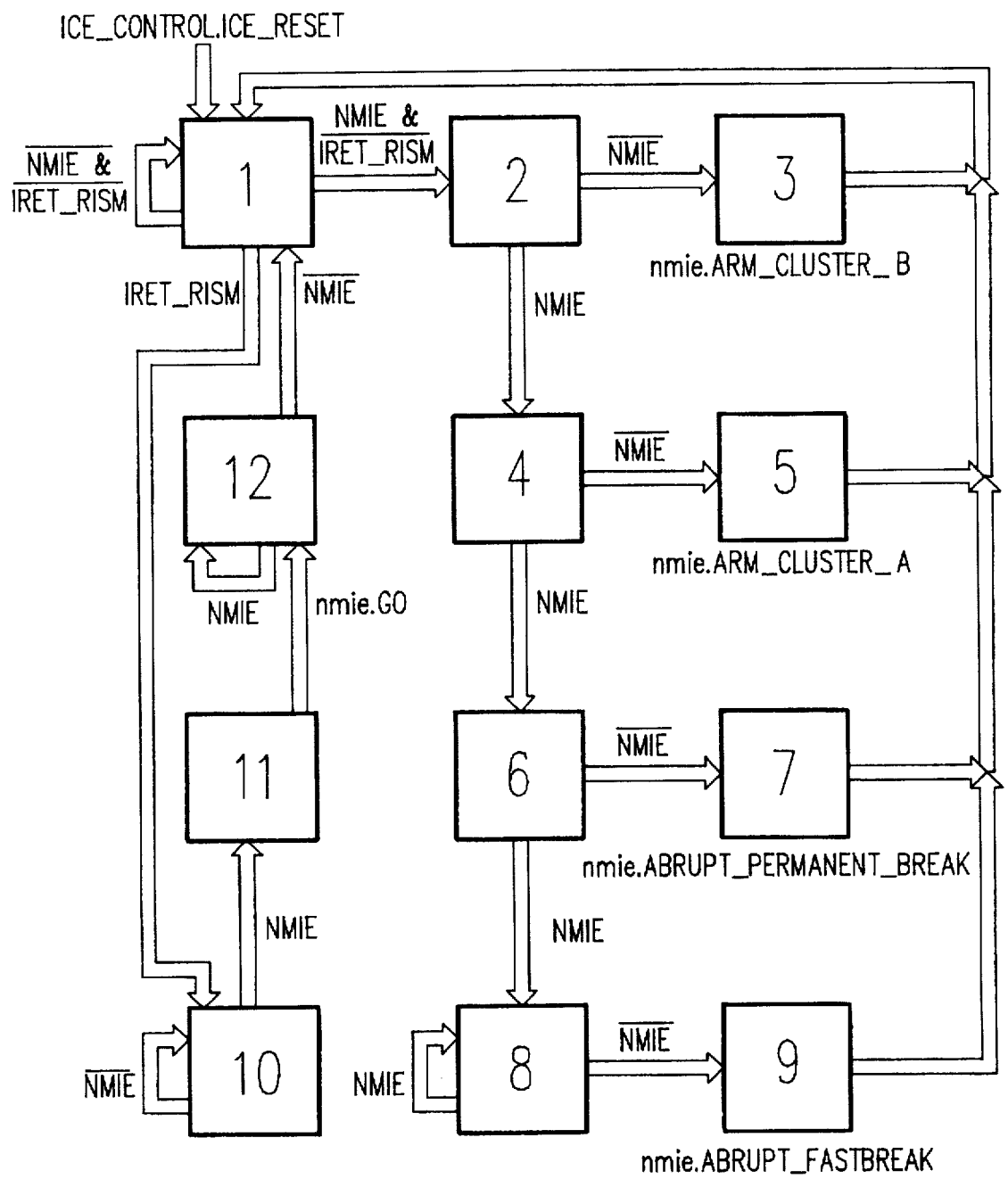
FIG. 3 is a state diagram of the nonmaskable interrupt for the emulator within the external process sequencer shown in FIG. 1.

The state diagram of FIG. 3 shows 12 states for a nonmaskable interrupt for the emulator (NMIE). When in the interrogation state the GO signal is activated during State 11 if IRET is executed and the NMIE is inactive for one cycle, and then NMIE is active for at least one cycle. GO signals the transition from interrogation to emulation. Upon entering the emulation state, the user process is restored. GO is initiated by the execution of an IRET instruction when in the interrogation state. The NMIE signal is not needed for a return to emulation from a FAST INTERROGATION.

When in the emulation state, Arm Cluster B is active during State 3 after NMIE has been active for exactly one cycle. Arm Cluster A is active during State 5 after NMIE has been active for exactly two cycles. Abrupt Permanent Break is active during State 7 after NMIE has been active for exactly three cycles. Fast Break is active during State 9 after NMIE has been active for at least four cycles. In this manner, a single input pin, the NMIE pin, is able to arm either one of the two clusters. If the ICE Reset is activated, the state diagram goes back to State 1 regardless of the previous state.

Once a cluster is armed by the sequencer (12), an IP match from the IP matchers (26) that occurs after the cluster is armed results in a no-slip break, because as soon as the cluster fires in response to a break event, it having been previously armed, the emulation stops immediately. Some IPs are used by the logic analyzer and some are used by the on-chip IP matchers. There is a lag from the time that an IP is generated until the time that the logic analyzer responds to it. Suppose that the response from the logic analyzer is to arm the IP matcher. Suppose also that a second IP which is the proper value to cause an on chip match appears during this lag time after the first IP has armed the on-chip matcher through the logic analyzer. In this situation, the break which should have been initiated by the second IP will be missed.

In order to resolve this situation, a counter is provided in the logic analyzer (36). Once started, the counter runs a period of time and then shuts itself off. The length of the count before the counter times out and resets itself is the amount of time it takes for the logic to arm a cluster. If an IP match occurs during the time the counter is running, the sequencer does not issue an arm cluster A or an arm cluster B signal to the break logic (18 and 19) but instead immediately issues an abrupt permanent break to the abrupt break logic (20).

Refer to FIG. 4 which is a block diagram of the mode logic (14) shown in FIG. 1. If IRET is active and ICE BIT is not asserted, then the output of AND (100) is asserted which assert the mode.GO signal which initiates a transfer to the EMULATION state. From the EMULATION state, a PERMANENT_BREAK or a FASTBREAK causes the mode.INTERROGATION output of OR (102) to be asserted which initiates a return to the PERMANENT INTERROGATION state.

If IRET is active and ICE BIT is asserted, then the logic waits for the nmie.GO pulse to be asserted. When the nmie.GO pulse occurs, then the output of AND (104) is asserted which assert the mode.GO signal which initiates a transfer to the EMULATION state.. From the EMULATION state, a permanent break causes the logic to return to the PERMANENT INTERROGATION state.

In this logic a permanent break holds precedence over a fast break. From the EMULATION state, absent a permanent break, FASTBREAK being asserted causes the logic to transfer to the FAST INTERROGATION state. The IRET signal causes the logic to exit the FAST INTERROGATION state and return to the EMULATION state.

Figure 5:
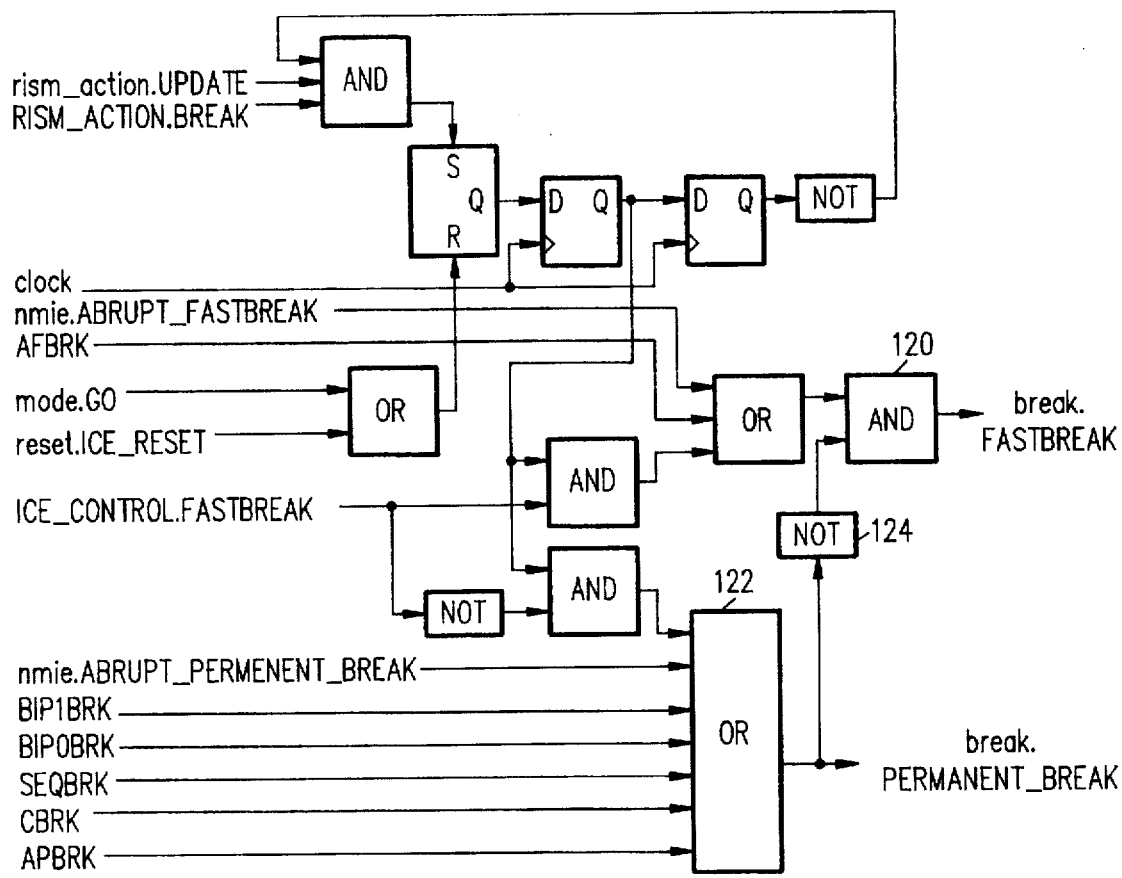
FIG. 5 is a block diagram of the fast and permanent break logic shown in FIG. 1.

Refer to FIG. 5 which is a block diagram of the fast and permanent break logic shown in FIG. 1. Assertion of the nmie.ABRUPT_FASTBREAK signal causes the output of AND (120) to assert the break.FASTBREAK signal to FIG. 4. Assertion of the nmie.ABRUPT_PERMANENT_BREAK signal causes the output of OR (122) to assert the break.PERMANENT_BREAK_signal to FIG. 4.

Figure 6:
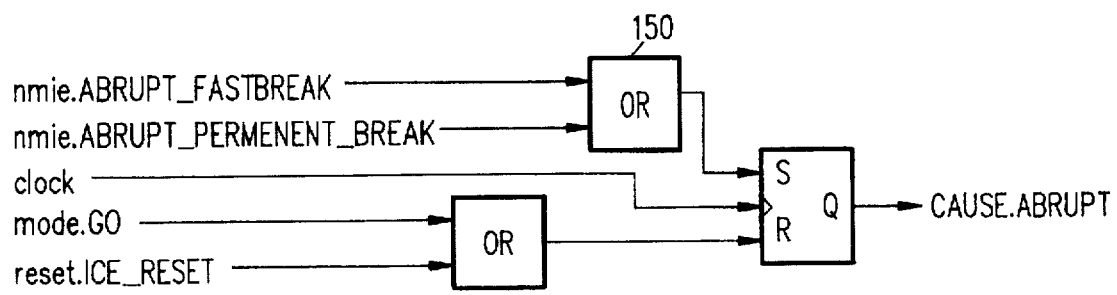
FIG. 6 is a block diagram of the abrupt break logic shown in FIG. 1.

Refer to FIG. 6 which is a block diagram of the abrupt break logic shown in FIG. 1. Assertion of the nmie.ABRUPT_FASTBREAK signal or assertion of the nmie.ABRUPT_PERMANENT_BREAK signal cause the output of OR (150) to be asserted resulting in the CAUSE_ABRUPT signal to the status register (34) of FIG. 1.

Figure 7:
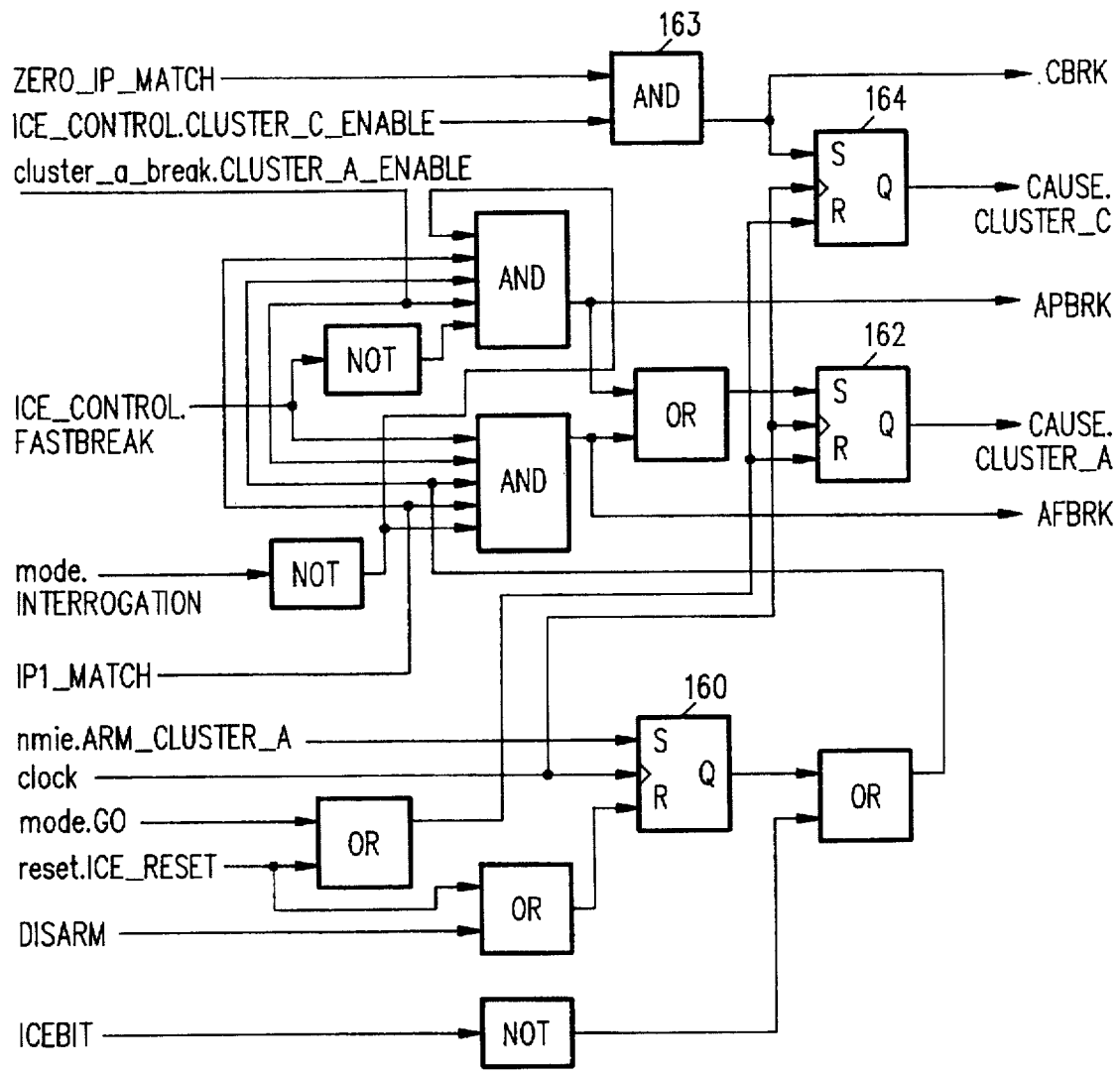
FIG. 7 is a block diagram of the Cluster A and C break logic shown in FIG. 1; and, FIG. 8 is a block diagram of the Cluster B break logic shown in FIG. 1.

Refer to FIG. 7 which is a block diagram of the Cluster A and C break logic (18) shown in FIG. 1. Cluster A is for fastbreaks, and may also generate permanent breaks. When enabled and armed, cluster A requests a break when IP1_MATCH is asserted. Cluster A is armed by latching in latch (160) the nmie.ARM_CLUSTER_A signal. Cluster A is disarmed when DISARM is asserted and resets latch (160).

Cluster C is for software breaks and is not programmable in the same manner as for the cluster A and cluster B breaks. Cluster C is enabled by asserting ICE_CONTROL.CLUSTER_C_ENABLE. When enabled, cluster C requests a permanent break upon the condition that ZERO_IP_MATCH is asserted (address 0 is executed) which through AND (163) sets latch (164).

Figure 8:
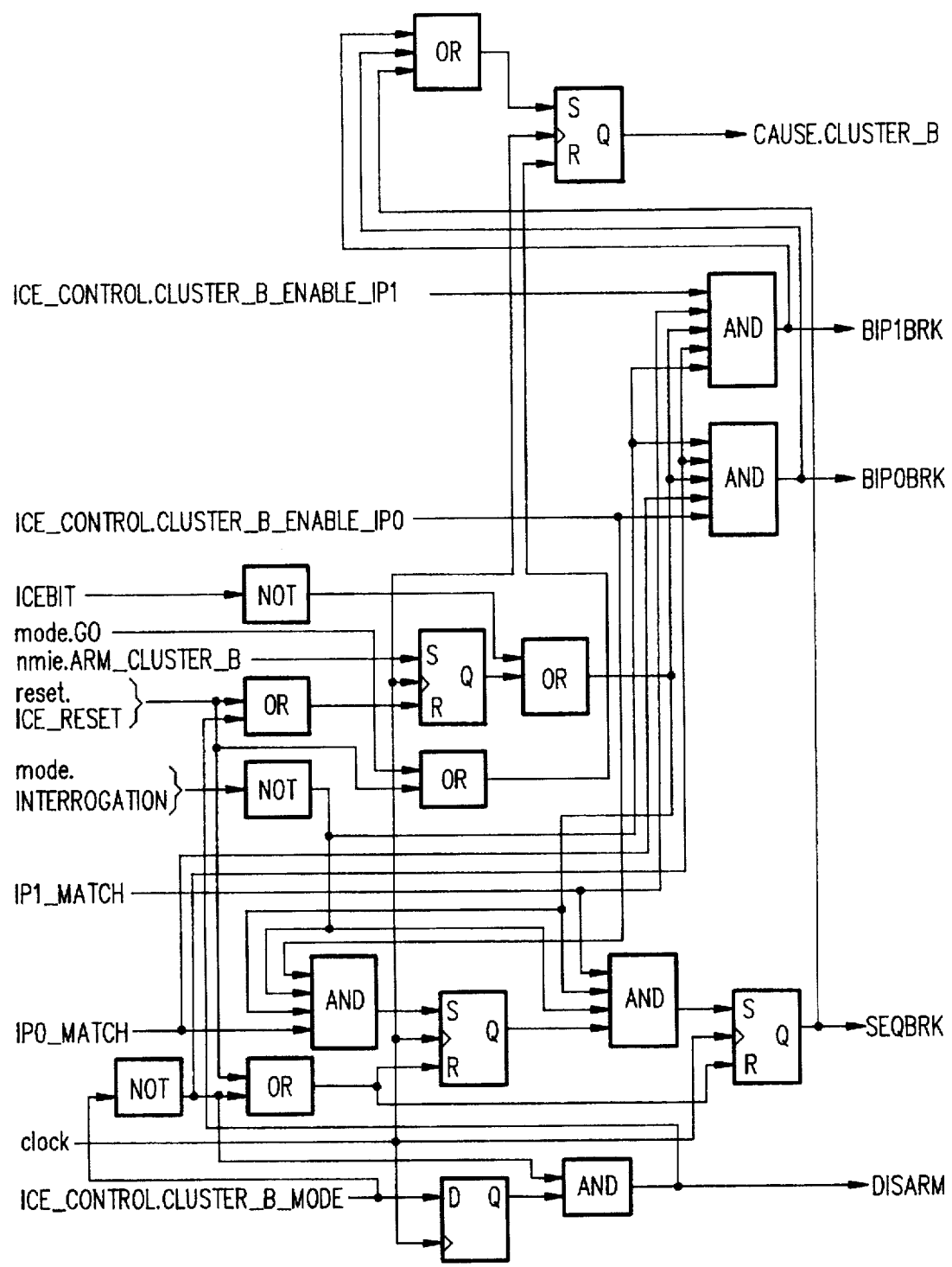

Refer to FIG. 8 which is a block diagram of the Cluster B break logic (32) shown in FIG. 1. Cluster B is for permanent breaks. When enabled and armed, cluster B requests a break in either of two operational modes.

In sequential mode, IP0_MATCH is assigned to stage 1, and IP1_MATCH is assigned to stage 2. Stage 1 is armed by NMIE. Stage 2 is armed when stage 1 is armed and IP0_MATCH occurs. A permanent break request is generated when stage 2 is armed and IP1_MATCH occurs. ICE_CONTROL.ICE_RESET high (1) resets the sequencer. jtag ICE_CONTROL.CLUSTER_B_MODE low (0) resets the sequencer.

In parallel mode, after having been armed, the first occurrence of either of the two enabled on-chip events, IP0_MATCH or IP1_MATCH requests a permanent break by asserting either BIP1BRK or BIP0BRK. The two enables are jtag ICE_CONTROL. CLUSTER_B_ENABLE_IP0 and ICE_CONTROL ICE_CONTROL.CLUSTER_B_ENABLE_IP1.

While the invention has been particularly shown and described with reference to preferred embodiments thereof, it will be understood by those skilled in the art that the foregoing and other changes in form and detail may be made therein without departing from the scope of the invention.

What is claimed is:

1. An in-circuit emulator comprising:

an input pin;

a sequencer coupled to the input pin, the sequencer having a first output being active upon a condition that the input pin is active for one cycle, and a second output being active upon a condition that the input pin is active for two cycles;

a first break logic coupled to the first output, the first break logic having an output; and a second break logic coupled to the second output, the second break logic having an output.

2. The emulator in accordance with claim 1 wherein the sequencer has an abrupt fast break output and an abrupt permanent break output, the emulator further comprising:

a third break logic having a first output being active upon a condition that the input pin is active for three cycles, and a second output being active upon a condition that the input pin is active for four cycles; and a fourth break logic having an output coupled to the sequencer.

3. The emulator in accordance with claim 2 wherein the emulator further comprises:

a status register being connected to the output of the fourth break logic, to the output of the first break logic and to the output of the second break logic, the status register recording a cause of a break in response to one of the output of the fourth break logic, the output of the first break logic and the output of the second break logic.

4. The emulator in accordance with claim 2 wherein the emulator further comprises:

an instruction pointer (IP) counter;

a control register coupled to a plurality of input pins, the control register having a first output and a second output; and an IP matcher having a first output and a second output, the IP matcher coupled to the IP counter and the first and second outputs of the control register, the IP matcher asserting the first output of the IP matcher upon a condition that the first output of the control register and the IP counter are equal, and the IP matcher asserting the second output of the IP matcher upon the condition that the second output of the control register and the IP counter are equal.

5. The emulator in accordance with claim 1 wherein the emulator further comprises:

a status register being connected to the output of the first break logic and to the output of the second break logic, and the status register recording a cause of a break in response to one of the output of the first break logic and the output of the second break logic.

6. The emulator in accordance with claim 1 wherein the emulator further comprises:

an instruction pointer (IP) counter;

a control register coupled to a plurality of input pins, the control register having a first output and a second output;

an IP matcher having a first output and a second output, the IP matcher coupled to the IP counter and the first and second output of the control register, the IP matcher asserting the first output of the IP matcher upon a condition that the first output of the control register and the IP counter are equal and the IP matcher asserting the second output of the IP matcher upon a condition that the second output of the control register and the IP counter are equal;

the first break logic coupled to the second output of the IP matcher, the first break logic asserting the output of the first break logic in response to the second output of the IP matcher; and the second break logic coupled to the first output of the IP matcher, the second break logic asserting the output of the second break logic in response to the first output of the IP matcher.

7. An in-circuit emulator comprising:

an input pin;

a sequencer coupled to the input pin, the sequencer having a first output being active upon a condition that a second output is asserted and that the input pin is active for four cycles, a third output being active upon a condition that the second output is asserted and the input pin is active for two cycles, a fourth output being active upon a condition that the second output is asserted and that the input pin is active for two cycles, a fifth output being active upon a condition that the second output is asserted and that the input pin is active for one cycle, and a sixth output;

a first break logic coupled to the fourth output having an output;

a second break logic coupled to the fifth output having an output;

a third break logic having a first output and a second output;

a fourth break logic coupled to the second output, the first output and the third output, the fourth break logic having an output;

a first logic coupled to the sixth output, the first and second outputs of the third break logic, the first logic having the second output that is asserted in response to the sixth output; and a status register coupled to the output of the first break logic, the output of the second break logic and the output of the fourth break logic, the status register recording a cause of a break in response to one of the output of the first break logic, the output of the second break logic and the output of the fourth break logic.

8. The emulator in accordance with claim 7 wherein the emulator further comprises:

an instruction pointer (IP) counter;

a control register coupled to a plurality of input pins, the control register having a first output and a second output;

an IP matcher having a first output and a second output, the IP matcher coupled to the IP counter and the first and the second outputs of the control register, the IP matcher asserting the first output of the IP matcher upon a condition that the first output of the control register and the IP counter are equal, and the IP matcher asserting the second output of the IP matcher upon a condition that the second output of the control register and the IP counter are equal;

the first break logic coupled to the second output of the control register, the first break logic asserting the fourth output in response to the second output of the control register; and the second break logic coupled to the first output of the control register, the second break logic asserting the fifth output in response to the first output of the control register.

9. An in-circuit emulator comprising:

an input pin;

a plurality of break logic circuits each having at least one output; and a sequencer, coupled to the input pin and the plurality of break logic circuits, wherein the sequencer selects one of the plurality of break logic circuits in response to a trigger and the number of cycles the input pin is asserted.

10. The in-circuit emulator of claim 9, further comprising:

a status register, coupled to the at least one output of the plurality of break logic circuits, operative to store the status of each of the at least one output of the plurality of break logic circuits when one of the plurality of break logic circuits is selected.

11. An in-circuit emulator comprising:

an input pin;

a sequencer coupled to the input pin, the sequencer having a first output being active upon a first condition from the input pin and a second output being active upon a second condition from the input pin;

a first break logic coupled to the first output, the first break logic having an output; and a second break logic coupled to the second output, the second break logic having an output.

12. An in-circuit emulator comprising:

an input pin;

a sequencer coupled to the input pin, the sequencer having an arm Cluster A output being active upon a condition that the input pin is active for one cycle, and an arm Cluster B output being active upon a condition that the input pin is active for two cycles;

an instruction pointer (IP) counter;

a control register coupled to a plurality of input pins, the control register having an IP match 0 output and an IP match 1 output;

an IP matcher having an IP 0 match output and an IP 1 match output, the IP matcher coupled to the IP counter, the IP match 0 output and the IP match 1 output, the IP matcher asserting the IP 0 match output upon a condition that the IP match 0 output and the IP counter are equal, and the IP matcher asserting the IP 1 match output upon a condition that the IP match 1 output and the IP counter are equal;

a Cluster A break logic coupled to the IP 1 match output and the arm Cluster A output, the Cluster A break logic asserting a cause Cluster A output in response to the IP 1 match output; and a Cluster B break logic coupled to the IP 0 match output and the arm Cluster B output, the Cluster B break logic asserting a cause Cluster B output in response to the IP 0 match output.

13. An in-circuit emulator comprising:

an input pin;

a sequencer coupled to the input pin, the sequencer having an abrupt fast break output being active upon a condition that a mode go output is asserted and that the input pin is active for four cycles, an abrupt permanent break output being active upon a condition that the mode go output is asserted and the input pin is active for three cycles, an arm Cluster A output being active upon a condition that the mode go output is asserted and that the input pin is active for two cycles, and arm Cluster B output being active upon a condition that the mode go output is asserted and that the input pin is active for one cycle and a go output;

a Cluster A break logic coupled to the arm Cluster A output having a cause Cluster A output;

a Cluster B break logic coupled to the arm Cluster B output having a cause Cluster B output;

a fast and permanent break logic having a fast break output and a permanent break output;

an abrupt break logic coupled to the mode go output, the abrupt fast break output and the abrupt permanent break output, the abrupt break logic having a cause abrupt output;

a mode logic coupled to the go output, the fast break output and the permanent break output, the mode logic having the mode go output that is asserted in response to the go output; and a status register coupled to the cause Cluster A output, the cause Cluster B output and the cause abrupt output, the status register recording a cause of a break in response to one of the cause abrupt output, the cause Cluster A output and the cause Cluster B output.

* * * * *